US009537258B2

(12) United States Patent
Bencuya

(10) Patent No.: US 9,537,258 B2
(45) Date of Patent: Jan. 3, 2017

(54) SELF UNPLUGGING POWER CONNECTOR WITH LOAD CURRENT SENSING

(71) Applicant: Izak Bencuya, Saratoga, CA (US)

(72) Inventor: Izak Bencuya, Saratoga, CA (US)

( * ) Notice: Subject to any disclaimer, the term of this patent is extended or adjusted under 35 U.S.C. 154(b) by 120 days.

(21) Appl. No.: 14/494,563

(22) Filed: Sep. 23, 2014

(65) Prior Publication Data

US 2015/0137757 A1 May 21, 2015

Related U.S. Application Data

(60) Provisional application No. 61/904,526, filed on Nov. 15, 2013.

(51) Int. Cl.

*H02J 7/02* (2016.01)
*H01R 13/633* (2006.01)
*H01R 13/66* (2006.01)

(52) U.S. Cl.

CPC ........ *H01R 13/633* (2013.01); *H01R 13/6633* (2013.01); *H01R 13/6683* (2013.01)

(58) Field of Classification Search

CPC .............. H01R 13/633; H01R 13/6633; H01R 13/6683

USPC .................. 320/111, 162, 163; 439/152, 159

See application file for complete search history.

(56) References Cited

U.S. PATENT DOCUMENTS

| | | | | |
|---|---|---|---|---|
| 5,266,040 | A | 11/1993 | Merrill et al. | |
| 5,800,189 | A * | 9/1998 | Ahmed | H01R 13/7132 439/159 |
| 5,831,802 | A | 11/1998 | Ahmed et al. | |
| 6,540,533 | B1 | 4/2003 | Schreiber | |
| 2007/0258177 | A1 | 11/2007 | Galang et al. | |
| 2010/0008004 | A1 | 1/2010 | Galang et al. | |
| 2011/0254383 | A1* | 10/2011 | Franz | H02J 7/02 307/131 |
| 2013/0257442 | A1 | 10/2013 | Tang | |

OTHER PUBLICATIONS

PCT, International Search Report and Written Opinion of the International Searching Authority for International Application No. PCT/US2014/065578, Apr. 6, 2015, 11 pages.

Power Integrations, Inc.; Introduction to Green Power; San Jose, CA; Jan. 2012; (www.powerint.com).

Lawrence Berkeley National Laboratory; Standby Power; Defining and Measuring Standby; Berkeley, CA; Dec. 2008; (standby.lbl.gov/measure.html).

* cited by examiner

*Primary Examiner* — Edwards Tso
*Assistant Examiner* — Aaron Piggush
(74) *Attorney, Agent, or Firm* — Halit N. Yakupoglu

(57) ABSTRACT

A self unplugging power connector for charging mobile devices is provided. The self unplugging power connector includes electrical contact members for an electrical outlet, a release mechanism to remove the electrical contact members from the outlet and a current sensing circuit to activate the release mechanism when the circuit senses a current reduction.

19 Claims, 4 Drawing Sheets

SELF UNPLUGGING POWER CONNECTOR WITH LOAD CURRENT SENSING

RELATED APPLICATION

This application is related to and claims priority from U.S. Provisional Application No. 61/904,526 entitled "Self Unplugging Power Plug with Load Current Sensing" filed on Nov. 15, 2013, which is expressly incorporated by reference herein.

BACKGROUND

Field of the Invention

The present invention relates to electrical plugs and, more specifically, to an electrical plug with built in function for self unplugging in response to a current change.

Description of the Related Art

The introduction of mobile or portable computing and communication devices is rapidly changing our information society. Laptops or smart-phones equipped with wireless technologies allow users to communicate with other users, accomplish their tasks, accessing and sharing information sources anytime and anywhere. It is expected that the total number of mobile device users will continue to grow significantly with this trend especially in developing countries.

Mobile devices such as portable laptop computers, cell phones, tablet devices or the like are rechargeable battery powered devices, which are often equipped with power chargers or transformers. Adapters can convert AC power to DC power which is needed to charge the rechargeable batteries. Power adapters can also be designed as special plugs to plug into a wall power outlet. It is often very inconvenient and tedious activity for a mobile device user to routinely remove such charger plugs from wall outlets, for example, when the mobile device is charged or the user wants to leave that location. In such situations, the users often attempt to pull the cord in order to quickly remove the plug from the socket.

However, such pulling of the plug from a socket often damages electrical cords and plugs rendering them useless in a short usage time. Furthermore, such devices requiring an adapter continue consuming power if they are left plugged in. Even if the batteries are fully charged such devices keep drawing a trickle of standby power, typically, in the range of 200 to 900 milliwatt (mW). Standby power is defined as the power consumed while products are turned off or otherwise performing no useful function. According to a research conducted by Lawrence Berkeley National Laboratory (LBNL), about 10% of a typical residential electric bill is spent on standby power. Most electronic products continue to consume power unless they are unplugged. Particularly, if the devices using chargers are left connected to a power outlet, the adapters continuously get warm even if they are not used by the devices because they continuously draw and use standby power by converting it to heat energy.

Many existing chargers or other devices sold in the consumer market reduce stand-by power electronically but they still have measurable energy consumption, typically a consumption of less 300 mW. This is undesirable from the power consumption standpoint; therefore power management is critical consideration in mobile device design. The LBNL study recommends unplugging small appliances if they are not used for a prolonged period. The continuous power consumption of portable devices after the battery is fully charged also has a very detrimental effect on battery life and the batteries become incapable of holding charge after a few months. As such, considering the above mentioned popularity of rechargeable battery powered devices nowadays, even a partial solution to this unnecessary energy consumption could have major economic benefits.

Thus, it will become readily apparent that it would be highly desirable to provide the mobile devices with a charger auxiliary or enhancement having the capability of separating itself from an electrical outlet when the charging is complete or when the user wants to relocate the charger auxiliary or enhancement.

SUMMARY

The present inventions are related to self unplugging power connectors for mobile devices.

In one aspect of the present invention, a self unplugging power connector for electrically connecting a mobile device battery charger to a power outlet comprises contacts for providing electrical connection to a power outlet, a release mechanism configured to remove the contacts from the power outlet when activated, and a circuit configured to activate the release mechanism for unplugging the power connector from the power outlet when the circuit detects a current reduction from a first current value to a second current value.

In another aspect of the present invention, a method of external power management for a mobile device comprises providing a power connector including a release member operated by an activation member and a current sensing circuit controlling the activation member, electrically connecting the power connector to a rechargeable battery operated device to establish an electrical current flow between the electrical outlet and the rechargeable battery operated device, detecting a current reduction in the current flow by the current sensing circuit; and activating the activation member so as to push the release member against the electrical outlet to physically remove the power connector from the electrical outlet.

In yet another aspect of the present invention, a power connector for use in charging rechargeable batteries of portable devices, comprises a housing including electrical members to insert into an electrical outlet to establish electrical connection, at least one release member mounted in the housing for movement between advanced and retracted positions, an activation member configured to move the at least one release member from the retracted position to the advanced position to remove the power connector from the electrical outlet; and a circuit configured to detect the completion of charging the rechargeable batteries and to energize the activation member.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

The present invention provides an electromechanical power manager for a mobile device. In one embodiment, the electromechanical power manager may comprise a self unplugging power connector such as a self unplugging power plug or a self unplugging power plug adapter which can unplug automatically from an electrical outlet by means of a mechanical action when the electrical current required from the load, such as a rechargeable battery unit, gets lower than a predetermined level for a predetermined period of time.

The self unplugging power connector of the present invention may be used for mobile or portable devices using rechargeable battery power and/or power adapters, such as laptop computers, cell phones, smart phones, tablet devices, notebook computers and the like, which can be plugged in and out multiple times in many locations. The self unplugging power connector may establish a mechanical separation from the electrical socket and no effort needs to be made by a user, such as pulling it out to unplug it, and thereby the self unplugging power connector is not damaged during unplugging action. Alternatively, when the self unplugging power connector of the present invention is used to charge the rechargeable batteries of a device and left plugged by a user, the self unplugging power connector may automatically be disconnected from the electrical socket when a current reduction due to the charged battery is sensed by the self unplugging power connector. This feature along with other benefits eliminates the standby power consumption and provides significant power management advantages. As explained above, most mobile devices continue to consume power or standby power unless they are unplugged. Power adapters or chargers of the devices continuously draw standby power and burn it off as heat, if they are left connected to a power outlet.

Accordingly, a host circuitry within the self unplugging power connector may activate the unplugging action of the self unplugging power connector in response to a detected current reduction caused by a charged battery, and thereby prevents any standby power consumption. The self unplugging action of the self unplugging power connector withdraws its prongs from the electrical socket, such as a conventional wall socket into which the prongs have been inserted, thereby terminating the self unplugging power connector's electrical connection with the power network. As will be described below, the unplugging action of the self unplugging power connector is caused by a release member that is activated or ejected by an activation member controlled by the host circuitry of the self unplugging power connector. When activated, the release member, which is nested within the power connector, pushes against an outer surface of the socket by moving forward, and thus causes the withdrawal of the prongs from the socket receptacles while pushing the power connector body away from the socket.

Figure 1A:
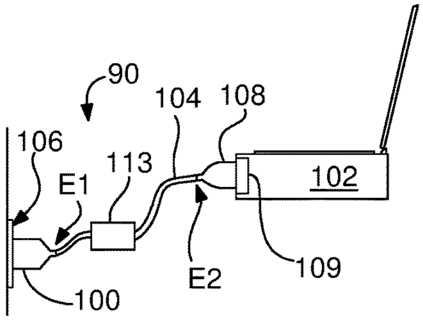
FIG. 1A-1C is an illustration of a portable device connected to an electrical outlet by an electrical cord using an embodiment of a power connector of the present invention.
Figure 1B:
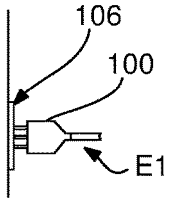
Figure 1C:
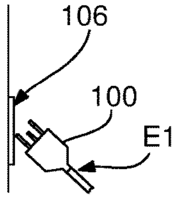

FIG. 1A shows an exemplary power charger unit 90 including a self unplugging power connector 100, or a first connector, of the present invention. The charger unit 90 may also include a power convertor or adapter 113 attached to an electrical line 104, or cord or cable, to provide power for an exemplary mobile device 102, such as a laptop computer, from a wall electrical outlet 106. The self unplugging power connector 100 may be attached to a first end E1 of the electrical line 104. As will be appreciated the exemplary self unplugging power connector 100 may also be designed as a power adapter or charger for a mobile phone, tablet device or the like, and it is within the scope of this invention. As will be described below, the self unplugging power connector 100 is configured to function as an external power manager capable of terminating current withdrawal through the charger unit 90 once a predetermined current reduction is detected by the self unplugging power connector 100. Attached to a second end E2 of the electrical line 104 is a device connector 108, or a second connector, which can be connected to a power port 109 of the mobile device 102 so as to provide current for the rechargeable batteries (not shown) of the mobile device. The power converter (AC/DC power converter) 113 or adapter converts the power received from the outlet 106 and supply the converted power to the mobile device 102. As shown in FIGS. 1B and 1C respectively, with the self unplugging action, the self unplugging power connector 100 may be either partially or fully withdrawn from the wall outlet 106 while it is fully disconnected from the power network. Exemplary self unplugging power connector embodiments are described below.

Self unplugging power connectors exemplified in the below embodiments may be for example: (a) self unplugging power (electrical) plugs to connect mobile devices to power networks; (b) self unplugging power adapters that may be used to connect power plugs or plugs of the mobile devices to power networks; and, (c) self unplugging power adapters/converters of the mobile devices that convert power for the mobile device. Self unplugging power connectors described in the following embodiments of the invention will be referred to as power connectors.

Figure 2A:
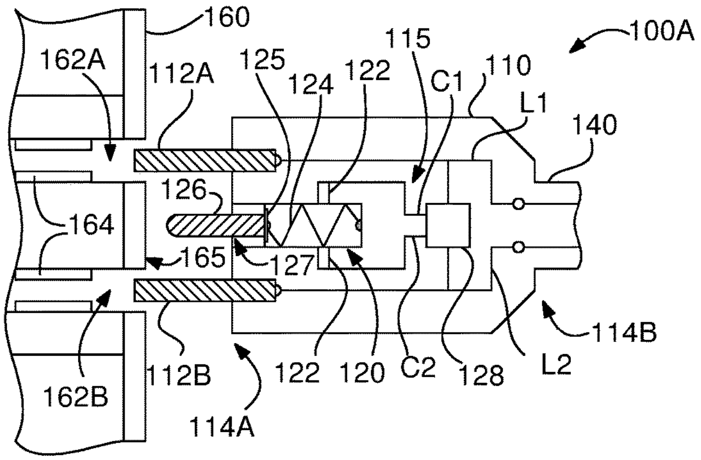
FIG. 2A-2B is a schematic view of an embodiment of a power connector of the present invention.
Figure 2B:
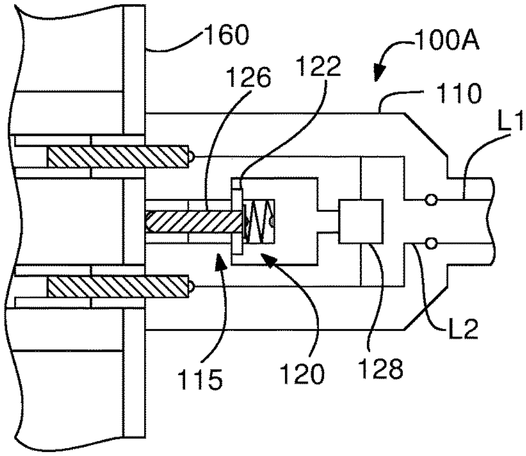

FIGS. 2A-2B show an embodiment of a power connector, such as a power plug 100A having a housing 110 including at least two electrical contacts 112A and 112B, or prongs as often referred to, at a first end 114A of the housing, to be inserted into corresponding holes 162A and 162B, or receptacles of an exemplary electrical outlet 160. Inside the holes 162A and 162B, there are receptacle contacts 164 connecting the outlet 160 to a power network (not shown). An electrical line 140 is connected to a second end 114B of the housing, and electrical wires L1 and L2 of the electrical line 140 are extended through an inner space 115 of the housing 110 and connected to the electrical contacts 112A and 112B in a known manner, for example, as shown in FIGS. 2A-2B. As described above in FIGS. 1A-1C, the power plug may be an integral part of a power charger unit. The electrical line 140 may connect the power plug 100A to a mobile device through a power adapter as described above. However, other components of the power charger unit such as the electrical line, adapter and the device connector are not shown for clarity in FIGS. 2A-2B. Preferably, built in the inner space 115, the housing 110 includes an activation member 120, a release member 126 and a current sensing circuit 128. A spring 124 of the activation member 120 is attached to an end plate 125 of the release member 126. In this embodiment the activation member 120 may comprise an electromechanical latch 122 (the latch 122, hereinafter). The latch 122 may be electrically connected to the current sensing circuit 128 with lines C1 and C2 to control the operation of the latch. The current sensing circuit 128 may be in turn electrically connected to the electrical wires L1 and L2 so as to track the power drawn by the mobile device 102 (FIG. 1A). The primary responsibilities of the current sensing circuit 128 are both tracking the current drawn through the power plug 100A and controlling the activation member 120.

Figure 3:
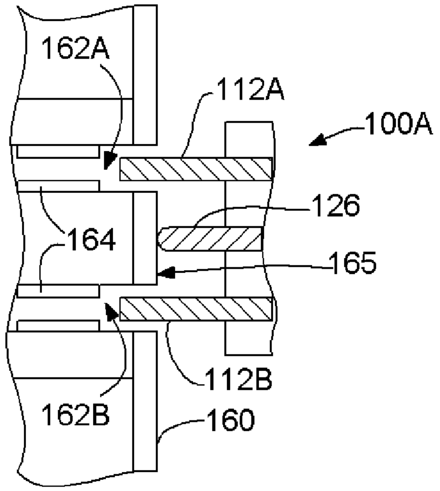
FIG. 3 is a partial schematic view of a power connector of the present invention.

As will be described below, when the power plug 100A is in a plugged-in state, the release member 126 may be in a retracted position within the housing 110 (FIG. 2B). When activated by the activation member 120, the release member 126 may advance outside the housing 110 through a hole 127 and disengage the power plug 100A from the outlet 150 (FIG. 3).

Referring to FIGS. 2A-2B, in this embodiment, the release member 126 may cooperate with the spring 124 in such a way that as the electrical contacts 112A and 112B of the power plug 100A are inserted into the outlet 160, the release member 126 is pushed backwardly by a surface 165 of the outlet 160 and fully compresses the spring 124. The latch 122 catches the end plate 125 with a mechanical action and keeps the release member 126 in a retracted position while biased by the spring 124. As soon as the power plug 100A is placed into this plugged-in state, for example, to charge a mobile device, the current sensing circuit 128 begins tracking the current flow from the outlet to the mobile device, and deactivates the latch 122, i.e., opens it, if a drop in current flow is detected. When released by the latch 122, decompressing action of the spring 124 moves the release member 126 forward against the surface 165 of the outlet 160 and automatically separates, or self unplugs, the power plug 100A from the outlet 160, thereby disconnecting the current flow, as shown in FIG. 3. The same process may be repeated many times by a user by plugging in the power plug and thereby pushing in the release member, and letting it self unplug with the action of the release member when the current to the load stops either if the load is taken away or the charging of a battery is completed.

In this and the following embodiments, the release member 126 may comprise a pin or a multitude of pins, preferably shaped as a round pin and most likely positioned between the electrical connectors 112A and 112B for best symmetric mechanical force to push the plug out of the wall socket. The pin may be a rigid metallic material, preferably a magnetisable or magnetic material. The pin may be coated with a polymer or another coating material. The pin material must be a durable and strong material to stay rigid. The tip of the pin that touches the outlet surface may be made of a polymer while the rest of the pin may be a magnetisable or magnetic material. The current sensing circuit 128 may be assembled on a printed circuit board and will fit into the power plug housing. The current sensing circuit 128 may be a control circuit with a current sensor and a time delay (not shown). The current sensing circuit 128 is powered by the electricity from the wall socket. The current sensing circuit 128 may be powered by AC power which may be converted to DC power in order to compare the load current to predetermined threshold levels or to the levels preset by an external adjustment knob or a thumbwheel.

In this embodiment, a time delay function may also be associated with the electromechanical latch 122 so that the release member 126 may be ejected in a slower manner by controlling the mechanical action of the spring 124. The time delay can be built by designing the spring 124 with a predetermined inertia or spring constant, which affects the speed of the release member 126 and hence the power plug 100A being ejected. The spring 124 with the predetermined inertia and the spring constant may be manufactured from a metallic spring material or hard polymer spring material. The release speed of the power plug 100A or the release member 126 may alternatively be enhanced and adjusted by additional mechanical friction created for the release member as it is released, for example by establishing friction between the hole 127 and the release member 126 by including a high friction material within the hole 127 and/or around the release member 126, such as a felt layer or a polymer layer. Accordingly, a power plug ejection or release speed may be less than about 5 cm/s, or in a range of about 0.1-1 cm/s or about 0.1-0.2 cm/s.

Figure 4A:
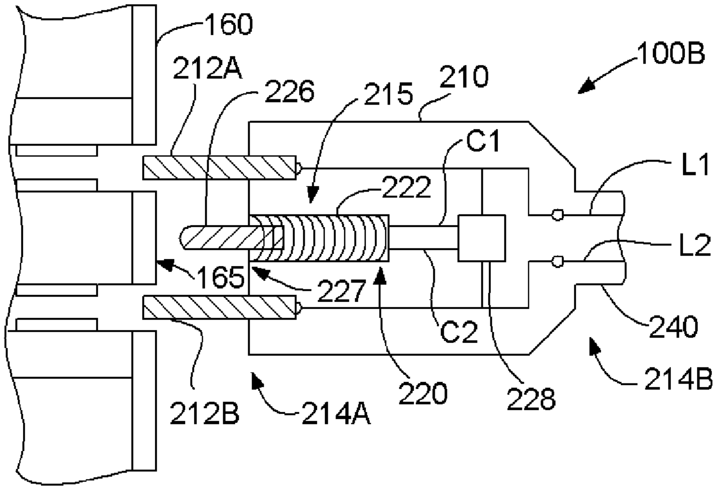
FIG. 4A-4B is a schematic view of another embodiment of a power connector of the present invention.
Figure 4B:
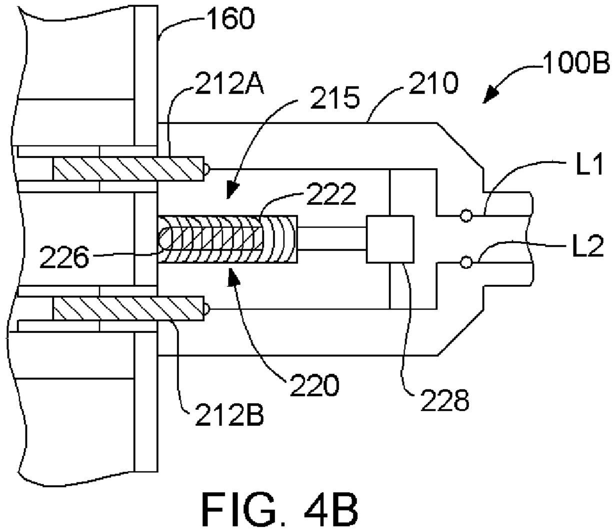

FIGS. 4A-4B show another embodiment of a power connector, such as a power plug 100B of the present invention. As in the previous embodiment, the power plug 100B includes a housing 210 with at least two electrical contacts 212A and 212B, at a first end 214A of the housing, to be inserted into the electrical outlet 160. An electrical line 240 is connected to a second end 214B of the housing 210. Electrical wires L1 and L2 of the electrical line 240 are extended through the inner space 215 of the housing 210 and connected to the electrical contacts 212A and 212B. As described above in FIGS. 1A-1C, the power plug 100B may be an integral part of a power charger unit. The electrical line 240 may connect the power plug 100A to a mobile device through a power adapter as described above. However, other components of the power charger unit such as the electrical line, adapter and the device connector are not shown for clarity in FIGS. 4A-4B. In the inner space 215, the housing 210 includes an activation member 220, a release member 226 and a current sensing circuit 228. The current sensing circuit 228 is connected to the electrical wires L1 and L2 and tracks the current drawn through the power plug 100B and controls the activation member 220.

In this embodiment, the activation member 220 may comprise a solenoid 222 that is electrically connected to the current sensing circuit 228 with electrical lines C1 and C2. The release member 226 may be positioned within the hollow space of the solenoid 222 so as to move the release member 226 with the electromagnetic action. When the power plug 100B is in plugged-in state, the release member 226 is in the retracted position within the solenoid 222. As soon as the current sensing circuit 228 detects a drop in current flow to the mobile device, the current sensing circuit activates the solenoid 222, and the resulting electromagnetic action moves the release member 226 through a hole 227 and forwardly against the surface 165, thus automatically separating the power plug 100B from the electrical outlet 160. In this embodiment, a time delay function may also be associated with the solenoid 222 so that the release member 226 may be ejected in a slower manner through the hole 227 by controlling the electromagnetic action of the solenoid 222 by a time delay circuit (not shown) included in the current sensing circuit 228. This way release speed of the release member 226 and hence the power plug 100B is slowed down and the power plug 100B comes out gently and slowly. The release speed of the power plug 100B or the release member 226 may alternatively be enhanced and adjusted by additional mechanical friction created for the release member 226 as it is released, for example by establishing friction between the hole 227 and the release member 226 by including a high friction material within the hole 227 and/or around the release member 226, such as a felt layer or a polymer layer. Accordingly, a power plug ejection or release speed may be less than about 5 cm/s, or in a range of about 0.1-1 cm/s or about 0.1-0.2 cm/s.

The current sensing circuit may have an adjustable current level as well as an adjustable timing delay for the activation of the release member when the activation member includes either the electro-mechanical latch 122 (FIGS. 2A-2B) or solenoid 222 (FIGS. 4A-4B).

Figure 5:
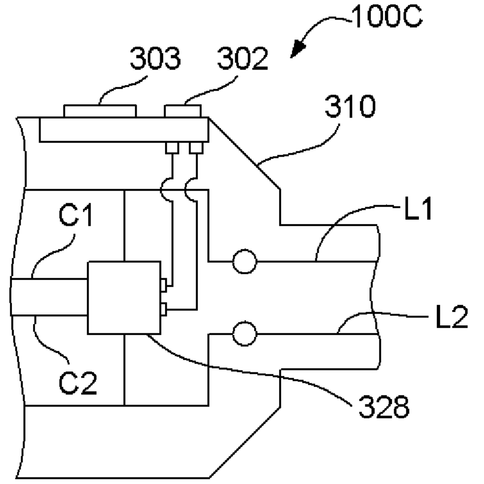
FIG. 5 is a schematic partial view of an embodiment of a power connector of the present invention including a time delay system.

As shown in FIG. 5, in a partial view, a current sensing circuit 328 of an exemplary power plug 100C may be connected to a time switch 302 or enable/disable switch and a current adjustment switch 303 built on a housing 310 of the power plug 100C. The current sensing circuit may be connected to an activation member including either an electromechanical latch or a solenoid, as shown above in FIGS. 2A, 2B, 4A and 4B, with lines C1 and C2. The time switch 302 may be used to enable or disable the power plug as well as used to enable or disable the current sensing circuit 328 for preset time periods for keeping the power plug plugged in for special circumstances, for example, for charging the batteries. The current adjustment switch 303 may be used to preset a current range for the current sensing circuit 328 to activate the self unplugging of the power plug 100C at the preset current level.

Figure 6A:
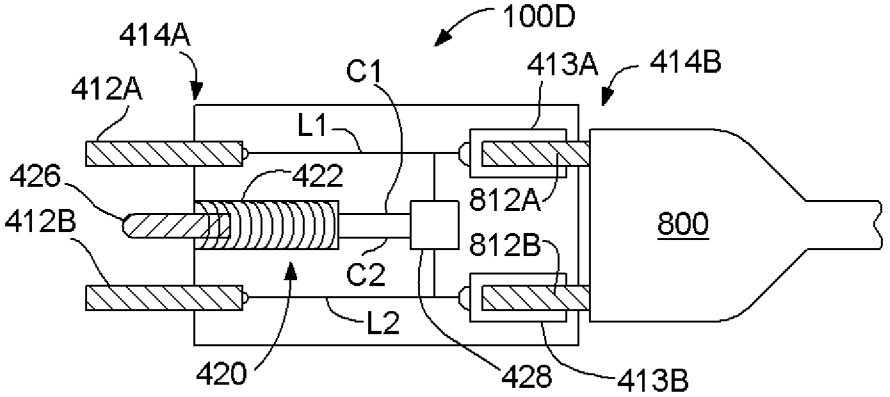
FIG. 6A-6B are schematic views of an embodiment of an adapter power connector of the present invention.

The principles of the present invention may be used to manufacture power plug adapters and other auxiliary devices which can be configured to be used directly or indirectly with mobile devices. Differing from the previous embodiments shown in FIGS. 2A-4B, the power plug adapters shown in the following embodiments may be used with conventional chargers including power converters or adapters. A conventional charger may be plugged into the self unplugging power plug adapters of the present invention so that when the power plug adapter self unplugs, the current flow to the charger plugged into the power plug adapter stops. FIG. 6A shows a power connector, such as an exemplary power plug adapter 100D to provide the above described self unplugging function when used as an adapter of an exemplary plug 800 or a power converter. The exemplary plug 800 may be a plug of a portable computer power cord including a power adapter. The exemplary plug 800 may also be an adapter or a power converter of a mobile phone, portable computer or the like. The power plug adapter 100D may be manufactured using the method of any one of the above embodiments and thus functions the same way. For example, the power plug adapter 100D may include an activation member 420, a release member 426 and a current sensing circuit 428 as described in the above embodiments. In this embodiment, the activation member 420 may comprise a solenoid 422 housing the release member 426 as described above. A first end 414A of the adapter 100D includes the electrical connectors 412A and 412 B, and a second end 414B at least two receptacles 413A and 413B to receive the corresponding electrical connectors 812A and 812B of the plug 800.

Figure 6B:
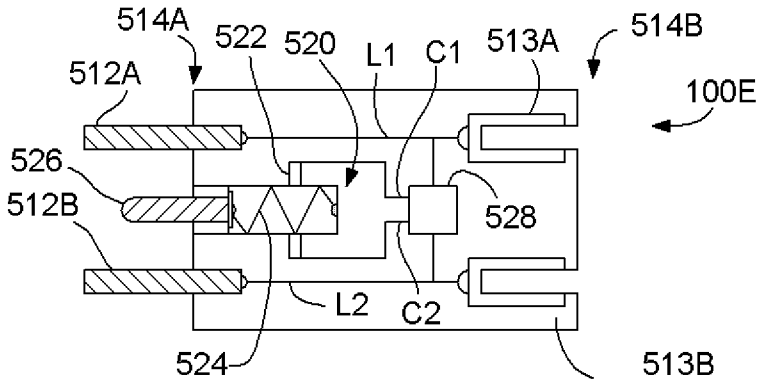

FIG. 6B shows another exemplary connector, such as a power plug adapter 100E to provide the above described functions when used as an adapter for the plug 800 (FIG. 6A) or a power converter. The power plug adapter 100E may be manufactured using the method of any one of the above embodiments and thus the self unplugging action functions the same way. For example, the power plug adapter 100E may include an activation member 520, a release member 526 and a current sensing circuit 528. In this embodiment, the activation member 520 may comprise electro-mechanical latch 522 including the release member 526 and a spring 524 as described above. A first end 514 A of the power plug adapter 100E includes the electrical connectors 512A and 512 B, and a second end 514B at least two receptacles 513A and 513B to receive the corresponding electrical connectors 812A and 812B of the exemplary plug 800 shown in FIG. 6A.

Figure 7A:
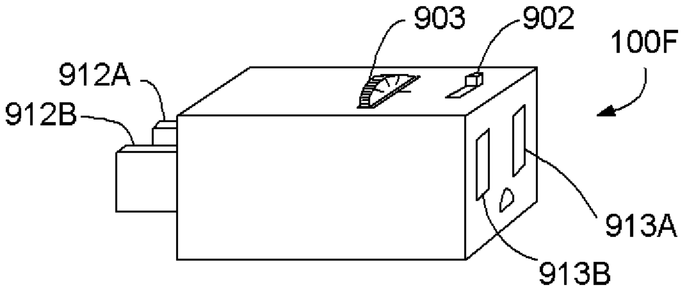
FIGS. 7A-7B are schematic views of an embodiments of an adapter power connector of the present invention.
Figure 7B:
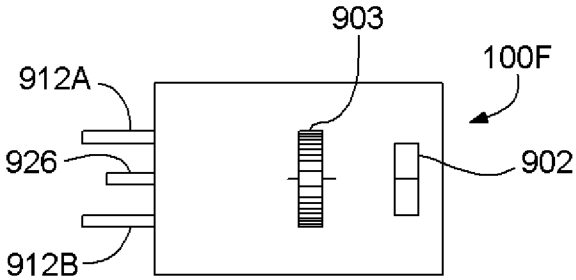

In FIG. 7A in perspective view and in FIG. 7B in top view, an exemplary power connector, such as a power plug adapter 100F is shown. The power plug adapter 100F includes electrical connectors 912A and 912 B to be connected to a power outlet (not shown), and at least two receptacles 913A and 913B to receive the electrical connectors or prongs of a plug or an adapter (not shown). The power plug adapter 100F may be manufactured using the method of any one of the above described power plug adapters 100D or 100E (FIGS. 6A and 6B) and thus the self unplugging functions the same way. The power plug adapter 100F may include a time switch 902 or enable/disable switch to enable or disable its current sensing circuit for preset time periods for keeping the power adapter plugged in for desired operations, for example, for charging the batteries of a mobile phone. The switch 902 enables or disables the power plug adapter's functions and also allows the user to set a predetermined operation time. At the end of this predetermined time, such as 2 hours or 3 hours, the power plug adapter 100F self unplugs by the activation member or release mechanism as described in the above embodiments. The power plug adapter 100F may also include an adjustment switch 903 to preset a current range to activate the unplugging of the power plug adapter 100F. The adjustment switch 903 may be a thumbwheel or a knob with marked current ranges. The power plug adapters shown in FIGS. 6A-7B, an ejection or release speed may be less than about 5 cm/s, or in a range of about 0.1-1 cm/s or about 0.1-0.2 cm/s.

For all the power connector embodiments above, a typical range of power reduction for the activation of the self unplugging function may be in the range of about 10-500 mW, about 30-500 mW, or about 10-50 mW, depending on the appliance and charging current. For example, if a current needed to charge the rechargeable batteries on a device is a first current having X amperes, a reduced current or a second current having Y amperes, which is detected by the current sensing circuitry to activate the unplugging operation, may be of about less than 100% of the first current value X, or in the range of about 1%-10% of the first current value X. Power connectors with a predetermined activation power value to self unplug may be designed in for dedicated products, such as laptops or mobile phones. Such power connectors self unplug when the predetermined power value or power reduction is sensed by the power connector. Alternatively, as exemplified in FIGS. 5, 7A and 7B, an activation power or current adjuster, such as a thumbwheel adjuster, may be added to the power connector next to a time switch to set a current or power value to activate the self unplugging of the power connector. For all the power connectors described above, a power connector ejection or release speed may be less than about 5 cm/s, or in a range of about 0.1-1 cm/s or about 0.1-0.2 cm/s. The self unplugging action of the power connector of the present invention, whether it is a power plug or a power plug adapter, may take place in a controlled speed or a reduced speed so that the power connector gently moves away from an electrical outlet and gets electrically disconnected without getting rapidly ejected. By controlling the speed of the unplugging of the power connector and enabling it to unplug at a reduced speed, the power connector may still be physically attached to the outlet while it is disconnected electrically, which prevents the power connector from falling on the ground and thus getting damaged. This may allow a user to remove the power connector easily from the electrical outlet without taking any extra effort to pull the power connector or its cord.

Figure 8A:
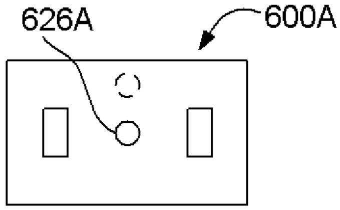
FIGS. 8A-8D are schematic bottom plan views of various power connectors having different release members.
Figure 8B:
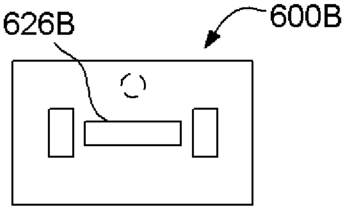
Figure 8C:
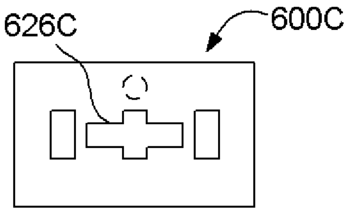
Figure 8D:
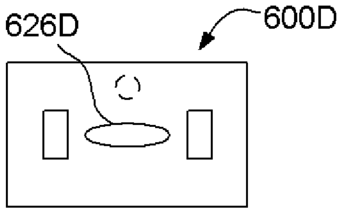

FIGS. 8A-8D show in bottom plan view of power connectors 600A-600D including exemplary release members 626A-626D respectively. Accordingly, in FIG. 8A a release member 626A may be a pin or shaft, as also shown in the above embodiments. Although the pin is shown round, it may have any cross-sectional geometries, such as square, rectangular, or octagonal, etc. In certain embodiments, the body of the release member may be a shaft or pin but the tip of the release member may be a small plate having different geometries as shown in FIGS. 8B-8D. FIG. 8B shows a release member with a rectangular tip 626B. FIG. 8C shows a release member with a cross-shaped tip 626C. FIG. 8D shows a release member with an oval tip 626D.

Although aspects and advantages of the present invention are described herein with respect to certain preferred embodiments, modifications of the preferred embodiments will be apparent to those skilled in the art. Thus the scope of the present invention should not be limited to the foregoing discussion, but should be defined by the appended claims.

I claim:

1. A self unplugging power connector for electrically connecting a mobile device battery charger to a power outlet, comprising:

contacts for providing electrical connection to a power outlet;

a release mechanism configured to remove the contacts from the power outlet when activated;

a circuit configured to activate the release mechanism for unplugging the power connector from the power outlet when the circuit detects a current reduction from a first current value to a second current value; and a current adjustment knob with marked current ranges for selecting a current value to activate the unplugging of the power connector.

2. The self unplugging power connector of claim 1, wherein the release mechanism is configured to move a release member against the power outlet to unplug the power connector when the circuit detects the current reduction.

3. The self unplugging power connector of claim 2, wherein the release mechanism is configured to move the release member at a speed that is reduced to unplug the power connector controllably.

4. The self unplugging power connector of claim 3, wherein the release mechanism is a solenoid.

5. The self unplugging power connector of claim 3, wherein the release mechanism is an electromechanical latch including a spring.

6. The self unplugging power connector of claim 4, wherein the circuit is configured to control the speed of the release member moved by the solenoid.

7. The self unplugging power connector of claim 5, wherein the spring is configured to control the speed of the release member.

8. The self unplugging power connector of claim 3, wherein speed of the release member is in the range of about 0.1-1 cm/sec.

9. The self unplugging power connector of claim 1 further including a time switch for setting a time to activate the unplugging of the power connector.

10. The self unplugging power connector of claim 2, wherein the release member is at least one pin.

11. The self unplugging power connector of claim 1, wherein the second current value is less than 100% of the first current value.

12. A method of external power management for a mobile device, comprising:

providing a power connector including a release member operated by an activation member and a current sensing circuit controlling the activation member;

electrically connecting the power connector to a rechargeable battery operated device to establish an electrical current flow between the electrical outlet and the rechargeable battery operated device;

detecting a current reduction in the current flow with the current sensing circuit; and activating the activation member so as to push the release member against the electrical outlet at a reduced speed rate of about 0.1-1 cm/sec to physically remove the power connector from the electrical outlet.

13. The method of claim 12, wherein the step of detecting the current reduction occurs when the electrical connection between the power connector and the battery operated device is terminated.

14. The method of claim 12, wherein the step of detecting the current reduction occurs when the rechargeable battery operated device is fully charged.

15. The method of claim 12, wherein the step of detecting the current reduction detects a power reduction in a range of about 30 mW-500 mW.

16. The method of claim 12, wherein the step of activating the activation member results in one of an electromagnetic effect and a mechanical effect pushing the release member against the electrical outlet.

17. A power connector for use in charging rechargeable batteries of portable devices, comprising:

a housing including electrical members to insert into an electrical outlet to establish electrical connection;

at least one release member mounted in the housing for movement between advanced and retracted positions;

an activation member configured to move the at least one release member from the retracted position to the advanced position when energized to remove the power connector from the electrical outlet;

a circuit configured to detect the completion of charging the rechargeable batteries, when the current is reduced from a first charging current to a second charging current, to energize the activation member; and a current adjustment switch disposed on the housing to preset the second charging current to activate the unplugging of the power connector.

18. The power connector of claim 17, wherein the second charging current is about 1%-10% of the first charging current.

19. The power connector of claim 17, wherein the current adjustment switch includes a thumbwheel or a knob with marked current ranges.

* * * * *